May 5, 1925.  
J. F. O'CONNOR  
1,536,129  
FRICTION SHOCK ABSORBING MECHANISM  
Original Filed July 19, 1922   2 Sheets-Sheet 2
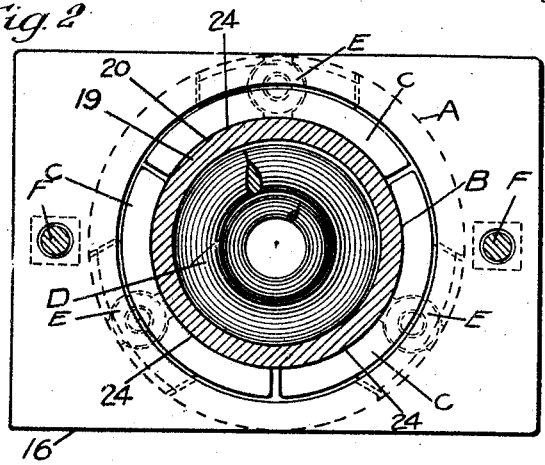
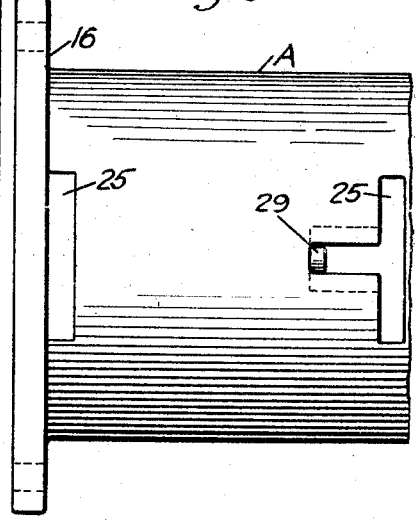
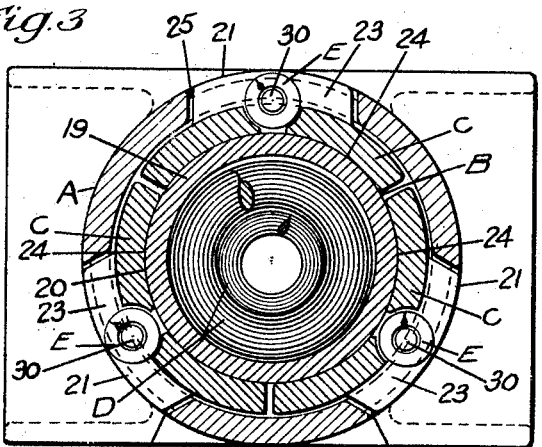
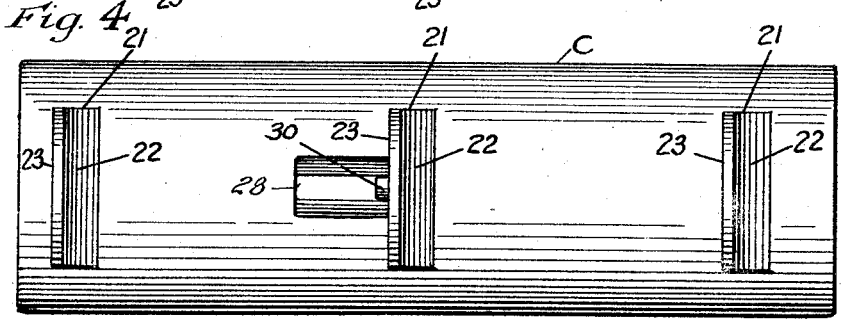
Inventor  
John F. O'Connor Patented May 5, 1925.

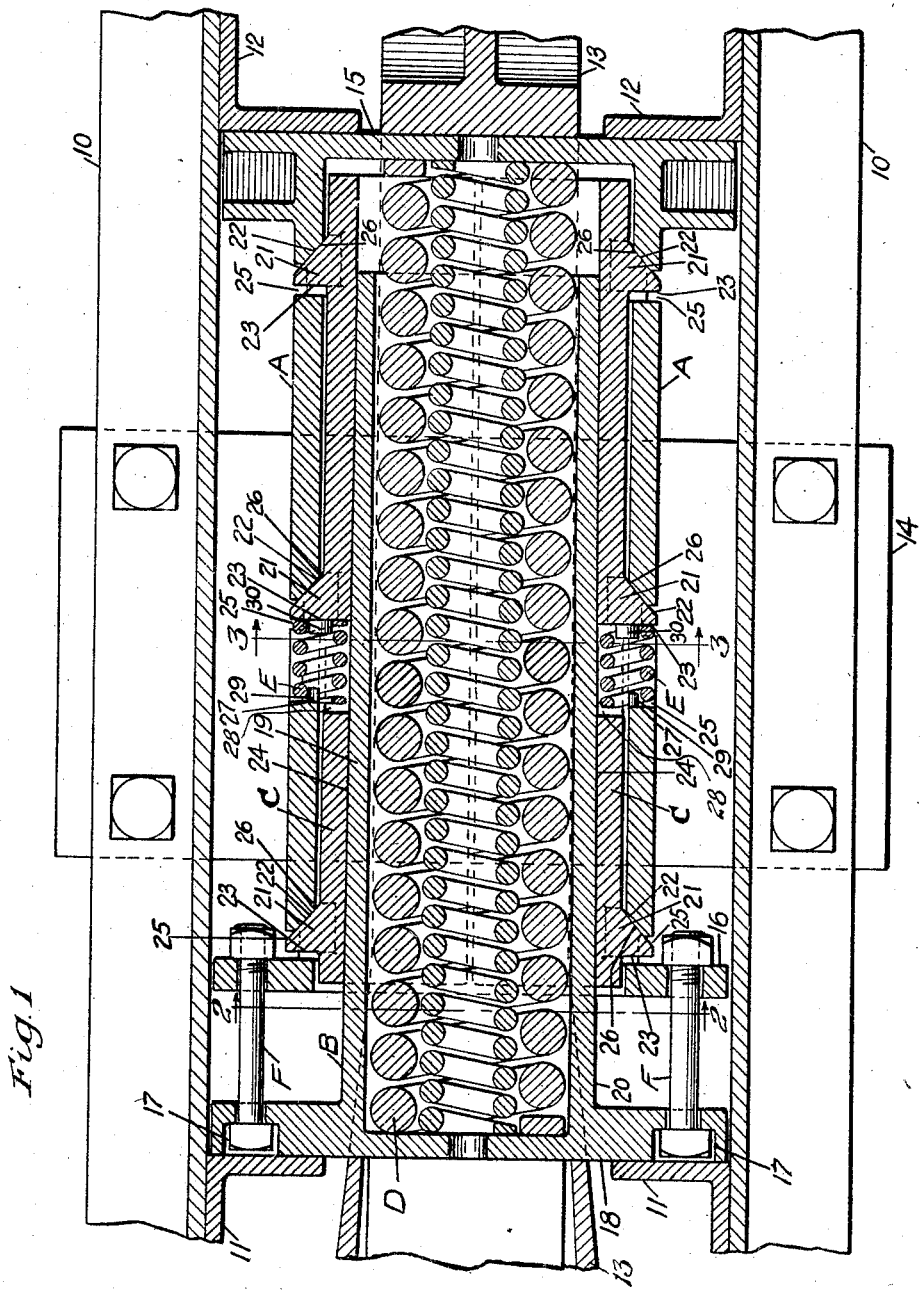

1,536,129

UNITED STATES PATENT OFFICE.

JOHN F. O'CONNOR, OF CHICAGO, ILLINOIS, ASSIGNOR, BY MESNE ASSIGNMENTS, TO W. H. MINER, INC., A CORPORATION OF DELAWARE.

FRICTION SHOCK-ABSORBING MECHANISM.

Application filed July 19, 1922. Serial No. 575,963. Renewed October 4, 1924.

*To all whom it may concern:*

Be it known that I, JOHN F. O'CONNOR, a citizen of the United States, residing at Chicago, in the county of Cook and State of Illinois, have invented a certain new and useful Improvement in Friction Shock-Absorbing Mechanisms, of which the following is a full, clear, concise, and exact description, reference being had to the accompanying drawings, forming a part of this specification.

This invention relates to improvements in friction shock absorbing mechanisms.

An object of the invention is to provide a friction shock absorbing mechanism especially adapted for railway draft riggings, and wherein are obtained high capacity, certain release, large friction wearing areas, and relatively low pressure per unit of friction area.

Other objects of the invention will more clearly appear from the description and claims hereinafter following.

In the drawings forming a part of this specification, Figure 1 is a horizontal longitudinal sectional view of a portion of a railway draft rigging showing my improvements in connection therewith. Figures 2 and 3 are vertical transverse sectional views corresponding to the section lines 2—2 and 3—3 of Figure 1, respectively. Figure 4 is an elevational view of the exterior side of one of the elongated friction shoes employed in my mechanism. And Figure 5 is an elevational view of the outer casing employed in my mechanism, the same being partly broken away in order to accommodate the view on the sheet.

In said drawings, 10—10 denote the usual channel draft sills of a railway car underframe, to the inner faces of which are secured front stop lugs 11 and rear stop lugs 12. The mechanism is operatively associated with a drawbar by any suitable means, such as the hooded cast yoke 13. The yoke 13 and the shock absorbing mechanism therewithin are supported in operative position by a detachable saddle plate 14.

The improved shock absorbing mechanism proper, as shown, comprises, broadly, an outer casing A; an inner telescoped casing B; a series of elongated friction shoes C; a main spring resistance D; a plurality of auxiliary springs E; and a plurality of retainer bolts F.

The outer casing A, preferably in the form of a casting, is of cylindrical form as clearly shown in Figures 2 and 3. Said cylindrical casing is open at its front or forward end and closed by an integral back wall 15 at its inner or rear end, said wall 15 being laterally extended and suitably reinforced so as to adapt it to act as the rear follower of the mechanism in conjunction with the stop lugs 12. At its front end, the outer casing A is also laterally flanged as indicated at 16 to provide means for anchoring the inner ends of the retainer bolts F, the latter being anchored at their other ends in suitable sockets 17 provided in a follower 18 formed integral with the inner casing B at the front or outer end of the latter.

The inner casing B is also of cylindrical form as indicated at 19 and of appreciably smaller diameter than the diameter of the outer casing A, the inner casing B being telescoped within the outer casing A. Said inner casing B provides an outer cylindrical friction surface 20 for its entire length. The lengths of the two casings A and B are made such that they may approach each other or telescope additionally for an amount corresponding to the permissible stroke of the draft gear.

The friction shoes C are preferably three in number, each extending through an arc of approximately 120°, as shown in Figures 2 and 3. Each shoe C is of a length slightly less than the length of the outer casing A and with the outer end of the shoe C normally located slightly within the outer end of the casing A. Each shoe C is provided on the outer side thereof, as shown, with a plurality of circumferentially extending ribs 21 spaced longitudinally of the shoe, each rib 21 providing a wedge face or surface 22 and a transversely extending shoulder or abutment 23. The inner side of each shoe C is formed to provide a curved friction surface 24 cooperable with the friction surface 20 of the inner casing B.

The outer casing A is apertured as indicated at 25 to correspond with the locations of the ribs 21. One edge of each opening 25 in the outer casing A is beveled as indicated at 26 to thereby provide a wedge face or surface cooperable with the corresponding rib 21. The opposite end of each opening 25 provides a shoulder 27. Said shoulders 27 are spaced from the shoulders 23 of the ribs 21 and, in the case of the centrally located openings 25, said shoulders 27 are spaced an appreciable distance from the transverse shoulders 23 of the intermediate ribs 21. Opposite the central openings 25 of the casing A, the shoes C are correspondingly apertured as indicated at 28 so that the two alined openings of each set are adapted to accommodate one of the auxiliary springs E, as clearly shown in Figures 1 and 3. Each spring E is preferably seated at its ends over suitable lugs 29 and 30, formed respectively on the outer casing A and the corresponding intermediate rib 21. It will be noted that the springs E tend to shift the shoes C relatively to the casing A so as to always maintain the sets of wedge surfaces in contact.

The spring D is disposed within the inner casing B and reacts at one end against the front follower 18 integral with the inner casing B and, at its other end, against the wall 15 of the outer casing A. It will be noted that the springs E are confined to a space which is within the outer surface of the casing A and the inner surface of the corresponding shoe C so that the springs E do not project outwardly and are thereby protected against injury.

The operation of the device, in compression, is as follows. As the two casings A and B are telescoped farther within each other, the shoes C tend to travel with the inner casing B and thereby are forced radially inwardly with greater and greater pressure, thus gradually and automatically increasing the pressure between the shoes C and the casing B, with consequent building up of frictional capacity. Upon removal of the actuating force, the spring D, previously compressed, expands, forcing the casings A and B apart, it being evident that during this action the shoes C will readily release or collapse because of the comparatively blunt angle of the wedge faces 22 and 26. Any tendency of the shoes C to stick with the casing B during the release action is readily overcome, inasmuch as the capacity of the spring D is very much greater than the combined capacity of the auxiliary springs E. As soon as the shoes C have released themselves and the casings A and B have been restored to normal condition, or possibly at some intermediate time during the release action, the springs E will automatically maintain the shoes C in proper relation with the casing A, with the parts thus ready for another action.

I have herein shown and described what I now consider the preferred manner of carrying out the invention, but the same is merely illustrative and I contemplate such changes and modifications as come within the scope of the claims appended hereto.

I claim:

1. In a friction shock absorbing mechanism, the combination with elongated telescoped inner and outer members, one of said members having friction surfaces and the other oppositely disposed wedge surfaces; of elongated friction shoes interposed between said telescoped members, each shoe having a friction surface on one side and wedge surfaces on the other side; a main spring resistance operative between said two members to yieldingly resist relative approach thereof; and additional spring means, associated with said shoes and said member having the wedge surfaces, tending to force said shoes and said wedge surfaced member in opposite directions, said additional spring means being located within openings provided in said wedge surfaced member and shoes.

2. In a friction shock absorbing mechanism, the combination with elongated telescoped hollow inner and outer casings, one of said casings having friction surfaces and the other oppositely disposed wedge surfaces; of elongated friction shoes interposed between the telescoped casings, each shoe having a friction surface on one side and wedge surfaces on the opposite side; a main spring resistance disposed within said inner casing and operative between the two casings to yieldingly resist relative approach thereof; and additional spring means, associated with said shoes and the casing having the wedge surfaces, tending to force said shoes and wedge surfaced casing in opposite directions, said additional spring means being located within openings provided in said wedge surfaced casing and shoes.

3. In a friction shock absorbing mechanism, the combination with elongated telescoped inner and outer members, said inner member being provided with exterior friction surfaces and the outer member being provided with wedge surfaces; of elongated friction shoes extending lengthwise of the mechanism beyond the center thereof, said shoes being interposed between said telescoped members, each shoe having a friction surface on its inner side co-extensive therewith, and wedge surfaces on its outer side; a main spring resistance operative between said two members to yieldingly resist relative approach thereof; and spring means, associated with said shoes and outer member, tending to force said shoes and outer member in opposite directions.

4. In a friction shock absorbing mechanism, the combination with elongated telescoped inner and outer members, said inner member being provided with exterior friction surfaces and the outer member being provided with wedge surfaces; of elongated friction shoes interposed between said telescoped members, each shoe having a friction surface on its inner side and wedge surfaces on its outer side; a main spring resistance operative between said two members to yieldingly resist relative approach thereof; and additional spring means, associated with said shoes and outer member, tending to force said shoes and outer member in opposite directions, said outer member and shoes being provided with alined openings within which said additional spring means are disposed.

5. In a friction shock absorbing mechanism, the combination with elongated telescoped inner and outer hollow casings, the inner casing having exterior friction surfaces and the outer casing having a plurality of wedge surfaces; of elongated friction shoes interposed between said telescoped casings, each shoe having a friction surface on its inner side and a plurality of wedge surfaces on its outer side; a main spring resistance disposed within the inner casing and operative between the two casings to yieldingly resist relative approach thereof; and additional spring means, associated with said shoes and outer casing, tending to force said shoes and outer casing in opposite directions.

6. In a friction shock absorbing mechanism, the combination with elongated telescoped inner and outer hollow casings, the inner casing having exterior friction surfaces and the outer casing having a plurality of wedge surfaces; of elongated friction shoes interposed between said telescoped casings, each shoe having a friction surface on its inner side and a plurality of wedge surfaces on its outer side; a main spring resistance disposed within the inner casing and operative between the two casings to yieldingly resist relative approach thereof; and additional spring means, associated with said shoes and outer casing, tending to force said shoes and outer casing in opposite directions, said outer casing and friction shoes having registering openings within which said additional spring means are disposed.

7. In a friction shock absorbing mechanism, the combination with elongated telescoped inner and outer members, one of said members having friction surfaces and the other oppositely disposed wedge surfaces; of elongated friction shoes interposed between said telescoped members, each shoe having a friction surface on one side and wedge surfaces on the other side; a main spring resistance operative between said two members to yieldingly resist relative approach thereof; additional spring means, associated with said shoes and said member having the wedge surfaces, tending to force said shoes and said wedge surfaced member in opposite directions, said additional spring means being located within openings provided in said wedge surfaced member and shoes; a follower at one end of said inner member and integral therewith; and a follower at the opposite end of the outer member and integral therewith.

8. In a friction shock absorbing mechanism, the combination with elongated telescoped inner and outer members, one of said members having friction surfaces and the other oppositely disposed wedge surfaces; of elongated friction shoes interposed between said telescoped members, each shoe having a friction surface on one side and wedge surfaces on the other side; a main spring resistance operative between said two members to yieldingly resist relative approach thereof; additional spring means, associated with said shoes and said member having the wedge surfaces, tending to force said shoes and said wedge surfaced member in opposite directions, said additional spring means being located within openings provided in said wedge surfaced member and shoes; and a plurality of retainer bolts anchored at one set of ends to the outer member to thereby hold the parts in assembled relation.

9. In a friction shock absorbing mechanism, the combination with a hollow outer casing having a plurality of wedge surfaces and openings opposite certain of said wedge surfaces; of an inner hollow casing telescoped within the outer casing and provided with exterior longitudinally extending friction surfaces; a plurality of elongated friction shoes interposed between said two casings, each shoe having a plurality of wedge surfaces on the exterior thereof cooperable with said wedge surfaces of the outer casing, each shoe having also an inner longitudinally extending friction surface cooperable with the friction surface of the outer casing, each shoe having an opening registering with one of said openings of the outer casing; a main spring resistance disposed within the inner casing and reacting at one end against said inner casing and at its other end against the outer casing; and a plurality of coil springs, each located in a set of registering openings of the outer casing and corresponding friction shoe, said springs reacting between the outer casing and the shoes and tending to force the latter longitudinally of the outer casing.

In witness that I claim the foregoing I have hereunto subscribed my name this 30th day of June, 1922.

JOHN F. O'CONNOR.

Witnesses:
UNA C. GRIGSBY,
ANN BAKER.